United States Patent [19]
Astle

[11] Patent Number: 5,436,666
[45] Date of Patent: Jul. 25, 1995

[54] LIMITED-DOMAIN MOTION ESTIMATION/COMPENSATION FOR VIDEO ENCODING/DECODING

[75] Inventor: Brian Astle, Phoenix, Ariz.

[73] Assignee: Intel Corporation, Hillsboro, Oreg.

[21] Appl. No.: 65,577

[22] Filed: May 21, 1993

[51] Int. Cl.⁶ .............................................. H04N 7/24
[52] U.S. Cl. ..................................... 348/416; 348/420
[58] Field of Search ............................. 358/105, 136; H04N 7/130; 348/402, 411, 412, 413, 416, 420, 699

[56] References Cited

U.S. PATENT DOCUMENTS

| | | | |
|---|---|---|---|
| 4,985,768 | 1/1991 | Sugiyama | 358/136 |
| 4,992,870 | 2/1991 | Samad | 358/105 |
| 5,005,077 | 4/1991 | Samad et al. | 358/105 |
| 5,130,797 | 7/1992 | Murakami et al. | 358/105 |
| 5,155,594 | 10/1992 | Bernstein et al. | 358/136 |
| 5,210,605 | 5/1993 | Zaccarin et al. | 358/136 |
| 5,260,782 | 11/1993 | Hui | 358/136 |

Primary Examiner—Howard W. Britton
Assistant Examiner—Richard Lee
Attorney, Agent, or Firm—Steve Mendelsohn; William H. Murray

[57] ABSTRACT

Methods and apparatuses for encoding video images using motion estimation and decoding encoded video images using motion compensation, where the motion estimation and/or the motion compensation is limited to subimages of the video images as defined by boundaries. Although motion compensation may not be used to estimate pels using data from the previous image frame that lies across the subimage boundaries, motion compensation may be used to estimate a portion of a block of the image frame being decoded using a region from the previous image frame that abuts a subimage boundary and is smaller than the block. The rest of the block may be estimated either by retaining the corresponding pels from the previous image frame or by replicating the pels from the previous image frame that lie along the subimage boundary.

56 Claims, 6 Drawing Sheets

IMAGE DECODER

IMAGE DECODER PROCESSING

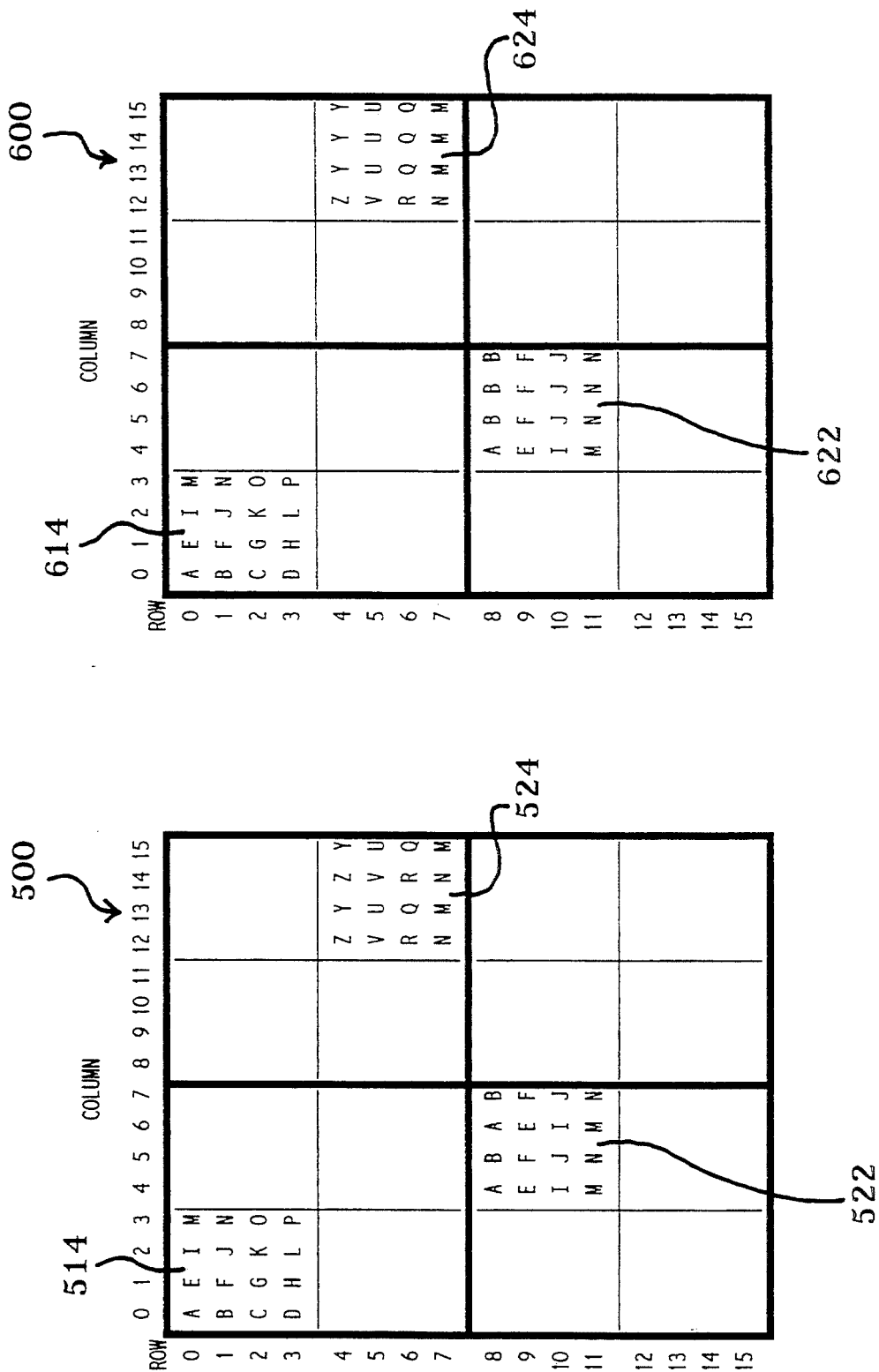

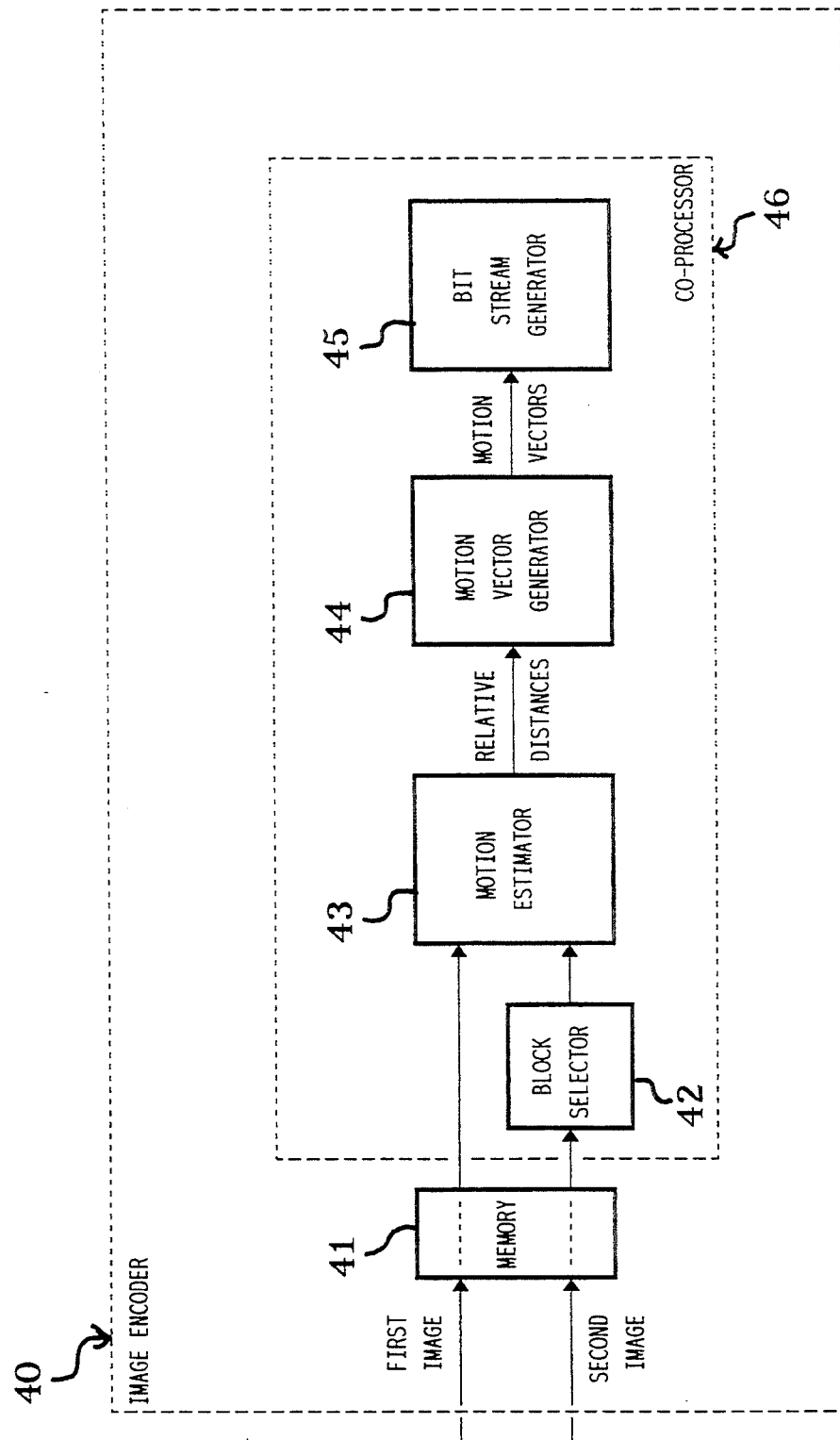
FIG. 4. IMAGE ENCODER

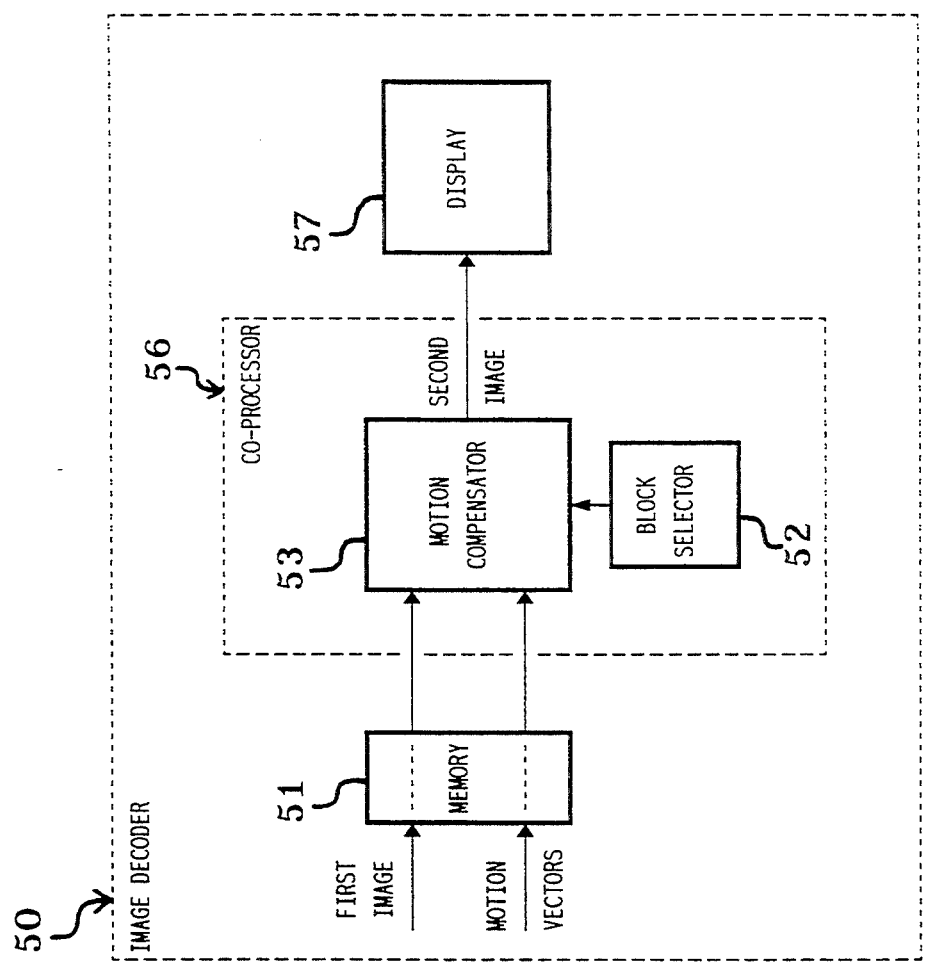
FIG. 5. IMAGE DECODER

FIG. 6. IMAGE DECODER PROCESSING
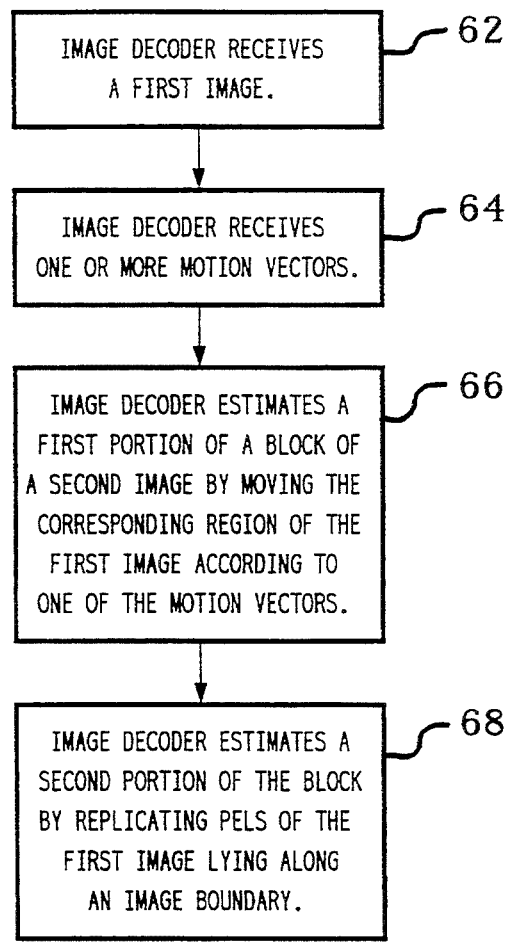

LIMITED-DOMAIN MOTION ESTIMATION/COMPENSATION FOR VIDEO ENCODING/DECODING

BACKGROUND OF THE INVENTION

1. Field of the Invention

The present invention relates to digital video image coding, and, in particular, to motion estimation for encoding video image data and to motion compensation for decoding encoded video image data.

2. Description of the Related Art

In order to transmit video images over narrow bandwidth channels and/or store video images efficiently, digital video data is preferably coded using known methods of compression. For example, to display real-time motion video on personal computer (PC) systems having limited available memory and processing time, the digital image data is preferably encoded utilizing as much of the redundancy in sequences of image frames as possible. For example, successive images in a sequence are visually similar. One way to take advantage of this redundancy is to encode video images using motion estimation and motion compensation. In motion estimation, an image encoder generates motion vectors that indicate the relative movements of different regions from one image frame to form an approximation to various regions in the next image frame.

Video images that are encoded using motion estimation are decoded using motion compensation. In motion compensation, an image decoder approximates an image frame by moving different regions of the previous image frame according to the motion vectors generated by an encoder during motion estimation.

In conventional motion estimation, an image frame n is divided into rectangular or square subimages called blocks. Each block of image frame n is then compared to the previous image frame n−1 to attempt to identify a region in the previous image frame n−1 that corresponds to that block of image frame n. A motion vector is then generated for each block of image frame n that has an identified corresponding region in image frame n−1. The motion vector indicates the relative vector distance between the block of image frame n and the corresponding region of image frame n−1.

The encoded image may be subsequently decoded using motion compensation in which the motion vectors indicate the regions of the previous image frame n−1 that are to be used to estimate blocks of the current image frame n. These estimated blocks may then be adjusted using additional correction data. Such additional correction data may be generated, for example, during encoding by taking the difference between each block of image frame n and each corresponding region of image frame n−1.

Referring now to FIG. 1, there are depicted graphical representations of two consecutive (16×16) pel images 100 and 200 in a video image sequence generated by a camera slowly panning from left to right across a fixed scene at a constant rate of two pels per frame. The letters A through Z are used in FIG. 1 to represent different pel values.

As the camera pans to the right, the image appears to shift to the left within the image boundaries. Thus, the data in columns 2 through 15 of image 100 are identical to the data in columns 0 through 13 of image 200. The data in columns 14 and 15 of image 200 correspond to a part of the scene that was outside of image 100. Note that, for the limited purposes of this description,ABstract. 1 does not depict all the pel data of images 100 and 200.

According to conventional motion estimation, image 200 may be divided into sixteen (4×4) subimages or blocks. The encoder then compares each individual block of image 200 to image 100 to attempt to identify the region of image 100 that most closely matches that block of image 200. For example, the encoder may select region 102 of image 100 (corresponding to rows 8 through 11 and columns 6 through 9) as most closely matching block 202 of image 200 (corresponding to rows 8 through 11 and columns 4 through 7). The encoder then generates a motion vector for block 202 that corresponds to the relative vector distance between region 102 and block 202.

The decoder may subsequently perform motion compensation to estimate (and, in this particular example, to reproduce exactly) block 202 of image 200 using only the data of image and the motion vector for block 202. The motion vector for block 202 instructs the decoder to shift the data from region 102 of image 100 to estimate block 202 of image 200. Thus, instead of representing block 202 by sixteen distinct pel values, block 202 may be more efficiently represented, in this example, by a single motion vector.

One rule of conventional motion estimation/compensation is that the encoder cannot instruct the decoder to move image data from outside the allowable area. For example, referring again to FIG. 1, conventional motion compensation cannot be used to estimate block 204 of image 200 (corresponding to rows 4 through 7 and columns 12 through 15). This is because part of the data in block 204 of image 200 was outside of previous image 100. Under the conventional rules of motion estimation/compensation, block 204 must be reconstructed using means other than motion compensation, such as by transmitting a reference or intra-coded block. A reference or intra-coded block is a block that is encoded without reference to any previous image frame.

As a result of this rule of conventional motion estimation/compensation, each region of a previous image frame n−1 that is identified as matching a block of current image frame n must be the same size as that block and must be contained entirely within the allowable area of previous image frame n−1.

In conventional non-real-time motion estimation/compensation applications, the allowable area over which motion compensation may be performed is limited only by the edges of the overall image. Motion vectors may be as large as necessary so long as the block in the current image frame n and the corresponding region in the previous image frame n1 both lie within the respective pel images and provided the coding scheme can accommodate such vectors. There are problems, however, with using conventional motion estimation/compensation to display real-time motion video on systems such as PC systems or other data players.

For example, if the entire image frame is defined as the allowable area, then the processing time required to perform motion estimation may exceed the requirements for real-time motion video. In general, the larger the area over which motion estimation is permitted to be performed, the greater the processing time required.

In addition, in systems such as PC systems, the image data for a given image frame may be stored in different sectors of a memory chip. If the allowable area is the entire image frame, motion compensation may require access to image data that crosses sector boundaries of the memory chip. Such access adds to the processing time and decoding based on such motion compensation may not meet the processing time requirements for real-time motion video.

It is accordingly an object of this invention to overcome the disadvantages and drawbacks of the prior art and to provide methods and apparatuses for performing motion estimation and motion compensation for displaying real-time motion video on conventional systems such as PC systems or other data players.

It is a further object of this invention to perform motion estimation and motion compensation under the hardware and software limitations imposed by video systems.

Further objects and advantages of this invention will become apparent from the detailed description of a preferred embodiment which follows.

SUMMARY OF THE INVENTION

According to a preferred embodiment, the present invention is a method used in coding video image data. According to this embodiment, a region of a first image is provided, where the region abuts a boundary of the first image. A non-zero motion vector corresponding to a block of a second image is also provided, where the block is larger than the region. A first portion of the block is then estimated by moving the region in accordance with the motion vector. The block of the second image is subsequently displayed.

According to an alternative preferred embodiment, the present invention is a method used in coding video image data. According to this embodiment, a first image and a second image are provided to an image encoder, where the first and second images are each divided into two or more subimages by one or more boundaries and each subimage of the first image corresponds to a subimage of the second image. Motion estimation is performed on each subimage of the second image in accordance with a corresponding subimage of the first image to generate one or more motion vectors for the second image. The first image is then provided to an image decoder and the one or more motion vectors are transmitted to the image decoder. Each of the subimages of the second image is estimated by performing motion compensation in accordance with at least one of the motion vectors and a corresponding subimage of the first image. The second image is then displayed.

According to another alternative preferred embodiment, the present invention is an apparatus used in coding video image data. The apparatus includes an image encoder and an image decoder. The image encoder receives a region of a first image and generates a non-zero motion vector corresponding to a block of a second image, wherein the region abuts a boundary of the first image and the block is larger than the region. The image decoder estimates a first portion of the block by moving the region in accordance with the motion vector.

According to another alternative preferred embodiment, the present invention is an apparatus used in coding video image data that includes an image encoder and an image decoder. The image encoder receives a first image and a second image, where the first and second images are each divided into two or more subimages by one or more boundaries and each subimage of the first image corresponds to a subimage of the second image. The image encoder also performs motion estimation on each subimage of the second image in accordance with a corresponding subimage of the first image to generate one or more motion vectors for the second image. The image decoder receives the first image and receives the one or more motion vectors. The image decoder then estimates each of the subimages of the second image by performing motion compensation in accordance with at least one of the motion vectors and a corresponding subimage of the first image.

BRIEF DESCRIPTION OF THE DRAWINGS

Other objects, features, and advantages of the present invention will become more fully apparent from the following detailed description of the preferred embodiments, the appended claims, and the accompanying drawings in which:

FIG. 3 depicts graphical representations of two (16×16) pel images that illustrate two preferred versions of motion compensation according to the present invention.

FIGS. 4 and 5 are block diagrams.

DESCRIPTION OF THE PREFERRED EMBODIMENT(S)

Figure 2:
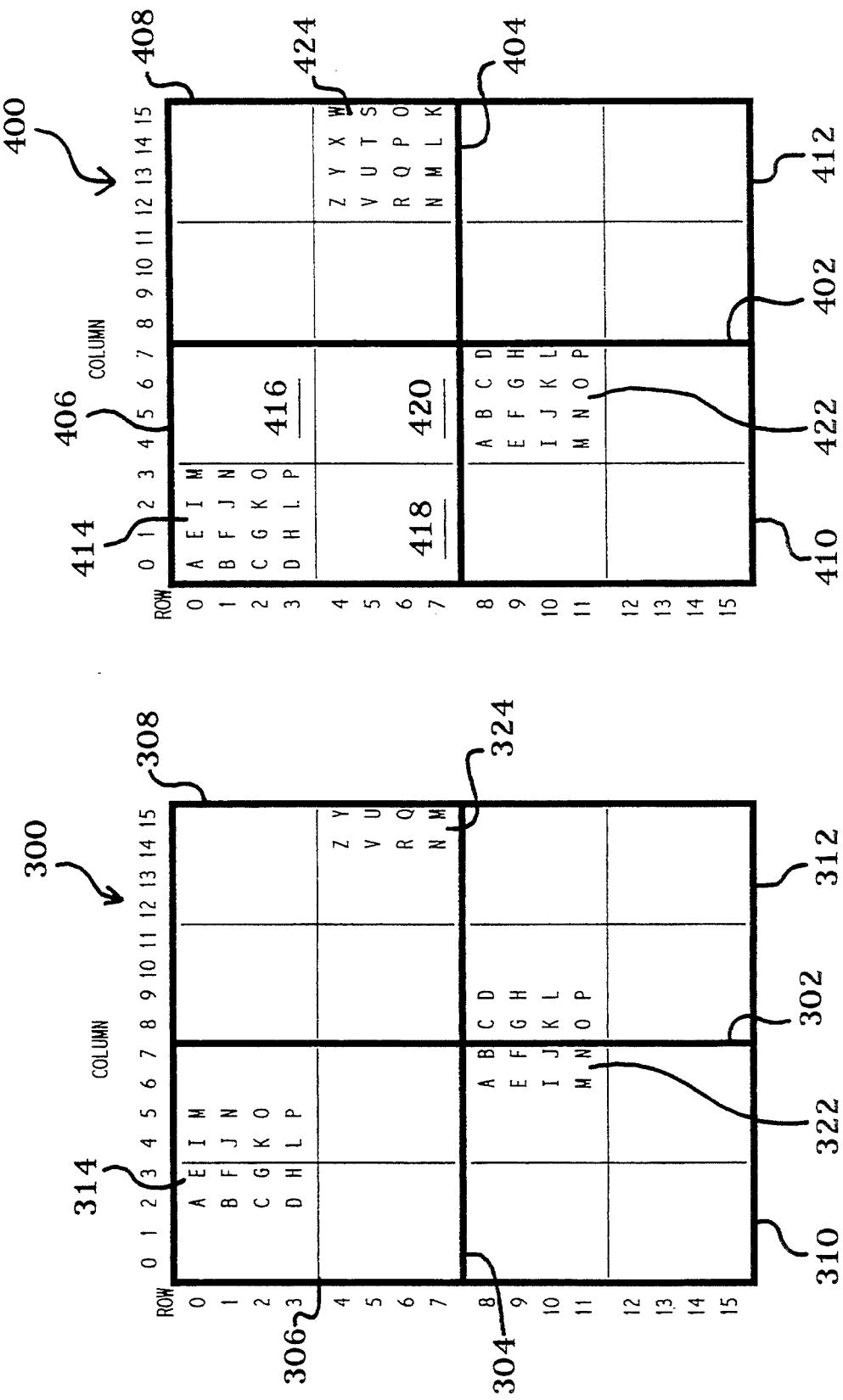
FIG. 2 depicts graphical representations of two consecutive (16−16) pel images in a video image sequence that illustrate motion estimation according to a preferred embodiment of the present invention.

Referring now to FIG. 2, there are depicted graphical representations of two consecutive (16×16) pel images 300 and 400 in a video image sequence that illustrate motion estimation according to a preferred embodiment of the present invention. According to this preferred embodiment, each image is divided into subimages and motion estimation is performed on each pair of corresponding subimages independent of the other subimages.

In the example of FIG. 2, image 300 is divided by boundaries 302 and 304 into four (8×8) pel subimages 306-312 and image 400 is divided by boundaries 402 and 404 into four (8×8) pel subimages 406-412. According to a preferred embodiment of the present invention, motion estimation is performed independently between subimage 306 of image 300 and subimage 406 of image 400, between subimage 308 of image 300 and subimage 408 of image 400, between subimage 310 of image 300 and subimage 410 of image 400, and between subimage 312 of image 300 and subimage 412 of image 400, More particularly, each of the subimages of image 400 is further divided into four (4×4) pel blocks. For example, subimage 406 is divided into blocks 414-420. Each block of image 400 is then compared only to the corresponding subimage of image 300 to identify a region of image 300 that most closely matches the block of image 400. For example, block 414 of subimage 406 of image 400 is compared to subimage 306 of image 300 to identify region 314 of image 300 (corresponding to rows 0 through 3 and columns 2 through 5) as the region of subimage 306 that most closely matches block 414. A motion vector is then generated based on the relative vector difference between region 314 of image 300 and block 414 of image 400.

Similarly, block 422 of subimage 410 of image 400 is compared to subimage 310 of image 300 to identify region 322 of image 300 (corresponding to rows 8 through 11 and only columns 6 and 7) as the region of subimage 310 that most closely matches block 422. Rows 8 through 11 and columns 8 and 9 of image 300 are not considered to be part of region 322 because they lie outside of subimage 310 (i.e., across boundary 302 and in subimage 312). Note that region 322 abuts boundary 302 and that region 322 is smaller than block 422. According to a preferred embodiment of the present invention, a non-zero motion vector is generated for block 422 based on the relative vector difference between region 322 of image 300 and block 422 of image 400.

Block 424 of subimage 408 of image 400 provides another example of motion estimation according to the present invention. Block 424 is compared to subimage 308 of image 300 to identify region 324 of image 300 (corresponding to rows 4 through 7 and only columns 14 and 15) as the region of subimage 308 that most closely matches block 424. Note that region 324 abuts the edge of image 300 and that region 324 is smaller than block 424. Under conventional motion estimation, no motion vector is assigned to block 424, because a portion of the corresponding region of image 300 lies outside of image 300. According to a preferred embodiment of the present invention, however, a non-zero motion vector is generated based on the relative vector difference between region 324 of image 300 and block 424 of image 400.

The boundaries of images 300 and 400 define the subimages of each image frame and therefore limit the domains of motion estimation and motion compensation processing. These boundaries may be selected according to different criteria. The edges of the overall images always constitute boundaries for the images.

In addition, boundaries may be imposed based on hardware considerations. For example, each of subimages 306-312 may be stored in a different sector of a memory chip. In order to reduce processing time, motion estimation may be restricted within each subimage to avoid the delays involved in accessing data across hardware boundaries.

Boundaries may also be imposed based on software considerations. Since the processing time for motion estimation increases as the allowable area for motion estimation increases, dividing the image into subimages to create multiple limited-domain allowable areas is another way to reduce processing time.

Moreover, if image frames are divided into subimages, then motion estimation and motion compensation processing may be performed in parallel by co-processors, where each co-processor processes a particular subimage independent of the other co-processors and other subimages. Such parallel processing provides yet another way to reduce processing time.

Referring now to FIG. 3, there are depicted graphical representations of two (16×16) pel images 500 and 600 that illustrate two preferred versions of motion compensation according to the present invention. Image 500 illustrates the results of estimating image 400 of FIG. 2 using the zero-vector method of motion compensation of the present invention. Image 600 illustrates the results of estimating image 400 limited-vector method of motion compensation of the present invention.

According to the zero-vector method, if motion compensation can be used to estimate only some of the pels of a particular block, then the other pels of that block are estimated by retaining the corresponding pels from the previous image. This is equivalent to setting the motion vectors to zero on a pel-by-pel basis for those pels for which motion compensation cannot be performed.

For example, image 500 is generated by performing zero-vector motion compensation using image 300 of FIG. 2 and the motion vectors generated during motion estimation performed on images 300 and 400 as described earlier in this specification. Block 514 of image 500 is estimated by shifting the data of region 314 of image 300 two pels to the left. All the pels of block 514 can be estimated by motion compensation because all of region 314 falls within subimage 306 of image 300.

On the other hand, for block 522 of image 500, columns 6 and 7 of block 522 cannot be estimated by motion compensation, because the corresponding data from previous image 300 lies outside of subimage 310 as defined by boundary 302 of image 300. As a result, while columns 4 and 5 of block 522 of image 500 are estimated by shifting region 322 two pels to the left, columns 6 and 7 of block 522 are estimated by retaining the corresponding pels of previous image 300 (i.e., the data in columns 6 and 7).

Similarly, columns 12 and 13 of block 524 of image 500 are estimated by shifting the data of region 324 of previous image 300 two pels to the left and columns 14 and 15 of block 524 are estimated by retaining the corresponding pels of previous image 300.

Image 600 illustrates the limited-vector method of motion compensation of the present invention. According to this method, if motion compensation can be used to estimate only some of the pels of a particular block, then the other pels of that block are estimated by replicating the pels lying along the appropriate boundary. This is equivalent to limiting the motion vector as required on a pel-by-pel basis to correspond to the vector distance from each pel in the previous image to that boundary.

Under the limited-vector method of motion compensation, block 614 of image 600 is estimated the same as block 514 of image 500 under the zero-vector method. On the other hand, while columns 4 and 5 of block 622 of image 500 are estimated by shifting region 322 two pels to the left, columns 6 and 7 of block 622 are estimated by replicating the pels lying along boundary 302 of image 300 (i.e., the data in column 7 of image 300).

Similarly, columns 12 and 13 of block 624 of image 600 are estimated by shifting the data of region 324 of image 300 two pels to the left and columns 14 and 15 of block 624 are estimated by replicating the pels of column 15 of image 300 (i.e., those lying along the right side of image 300).

Although it is slightly more complex to implement, the limited-vector method of motion compensation is preferable to the zero-vector method.

Those skilled in the art will understand that methods other than zero-vector motion compensation and limited-vector motion compensation also fall within the scope of the present invention. For example, data from outside the subimage may be estimated by interpolating based on pel data from inside the subimage using conventional interpolation schemes known to those skilled in the art.

In general, motion estimation is more computationally expensive than motion compensation, since an encoder has to look at many possibilities for the displacement of the region. For real-time applications, motion estimation usually requires some form of hardware assist, since general purpose processors such as the Intel 486 ® processors do not have the capability. In designing such hardware assist, the motion estimation processors may incorporate some of the features of the present invention, either because of the limited on-chip memory of each motion estimation processor or because several motion estimation processors will be used in parallel. The real-time encoding system will typically be written in a high-level language such as C, and may execute on a system containing a general purpose processor such as an Intel 486 ® or Pentium ® processor with hardware assistance such as the previously mentioned motion estimation processors and perhaps discrete cosine transform processors. In order to provide real-time encoding capability, the time critical parts of the algorithm will typically be written in machine language or microcode. Another general purpose processor which is suitable for this application is the Intel I750 ® which preferably has hardware to help in motion estimation in order to code to the international standards such as CCITT H.261 (P×64) standard or the ISO 11172 (MPEG) standard.

The hardware requirements for decoding are simpler than the encoding requirements unless hardware assist is required. For example, the Intel I750 ® is capable of decoding CCITT H.261 standard at a low data rate. For high data rates, some hardware assist may be used. Again, in such systems, it is customary to write the decoding algorithm in some high-level language while reducing the time-critical parts of the decoding algorithm to machine language or microcode.

Referring now to FIG. 4, there is shown a block diagram of image encoder 40, according to a preferred embodiment of the present invention. Image encoder 40 receives the first and second images and generates motion vectors used to encode the second image. In particular, memory 41 of image encoder 40 receives the first and second images. Block selector 42 series blocks of the second image, and motion estimator 43 compares the selected blocks to the first image to identify regions of the first image that correspond to the selected blocks of the second image. Motion vector generator 44 uses the relative distances between corresponding blocks of the first and second images to generate motion vectors that are used by bit stream generator 45 to encode the second image. In a preferred embodiment, block selector 42, motion estimator 43, motion vector generator 44, and bit stream generator 45 are implemented in a co-processor 46.

Referring now to FIG. 5, there is shown a block diagram of image decoder 50, according to a preferred embodiment of the present invention. Image decoder 50 uses the first image and the motion vectors that were used to encode the second image, to perform motion compensation to decode the second image for display. In particular, memory 51 receives the first image and the motion vectors for the second image. Block selector 52 selects blocks of the second image and motion compensator 53 uses the first image and the motion vectors for the second image to generate the selected blocks of the second image.

Those skilled in the art will understand that, unlike second image is then displayed on display 57. In a preferred embodiment, block selector 54 and motion compensator 53 are implemented in a co-processor 56.

Referring now to FIG. 6, there is shown a process flow diagram of the processing implemented by image decoder 50 of FIG. 5, according to a preferred embodiment of the present invention. Image decoder 50 receives a first image (step 62 of FIG. 6) and one or more motion vectors (64). Image decoder 50 estimates each subimage of a second image by performing motion compensation in accordance with at least one of the motion vectors and the corresponding subimage of the first image. To do this, image decoder 50 estimates each block of the second image by moving the corresponding region of the first image in accordance with one of the motion vectors. In particular, in a preferred embodiment, for at least one block of the second image, image decoder 50 estimates a first portion of the block of the second image by moving the corresponding region of the first image in accordance with one of the motion vectors (step 66). In addition, image decoder 50 estimates a second portion of the block by replicating one or more pels of the first image lying along at least one of the image boundaries (step 68).

Figure 1:
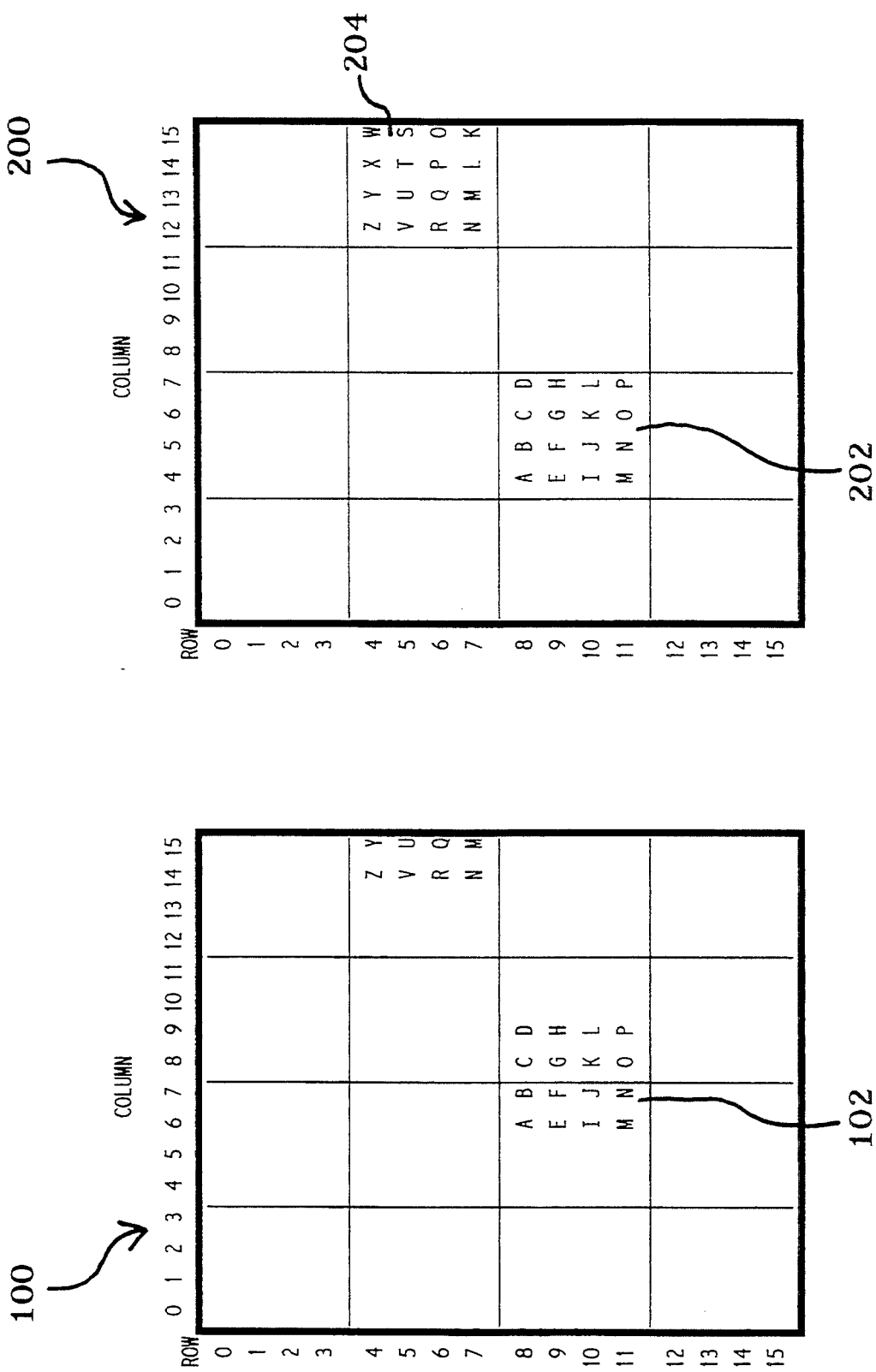
FIG. 1 depicts graphical representations of two consecutive (16×16) pel images in a video image sequence generated by a camera slowly panning from left to right across a fixed scene at a constant rate of two pels per frame.

Those skilled in the art will understand that, unlike the examples of Figs. 2 and 3, in general, motion estimation and motion compensation may involve shifting data in two directions at once, corresponding to the columns and rows of image data. It will also be understood that, unlike the examples of FIGS. 1 and 2, each block of an image frame may have a different motion vector, reflecting the possibility that different regions of an image may move in different directions relative to one another. For example, in a video image sequence of two cars approaching one another, blocks corresponding to one car will have motion vectors different from blocks corresponding to the other car.

Those skilled in the art will also understand that, under an alternative preferred embodiment of the present invention, motion estimation are not limited by internal boundaries (i.e., boundaries other than the outer edges of the image frame). In this embodiment, the processing of motion estimation may access pel data that lie across the internal boundaries that are to be imposed during motion compensation. Such cross-boundary access may aid in the identification of regions of a previous image that match blocks in the current image.

Under a further alternative preferred embodiment, internal image boundaries are shifted from image frame to image frame to reduce the visibility of coding artifacts adjacent to these boundaries in the decoded images. When images are divided into subimages for independent motion estimation and motion compensation processing, visible artifacts may appear corresponding to the boundaries between subimages. To reduce the visibility of these artifacts, the location of boundaries may be shifted during processing.

For example, when coding a sequence of (128×128) pel images, boundaries may be selected to be 16 columns apart but shifted in location by two pels for each successive image. As a result, boundaries may be selected at columns 15, 31, 47, etc. to code one image and then shifted to columns 13, 29, 45, etc. to code the next image, and so on for successive images. In this way, the location of the boundaries within the images varies from image to image and the visibility of artifacts in the decoded images will be reduced.

It will be understood by those skilled in the art that the motion estimation and motion compensation procedures of the present invention may be used in conjunction with other techniques for encoding and decoding video images. Those skilled in the art will also understand that the present invention may be used in various applications, including without limitation the display of video images on PC systems, point-to-point teleconferencing systems, and display of video images on dedicated data players such as information terminals.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method used in coding video image data, comprising the steps of:
   (a) providing a region of a first image, wherein said region abuts a boundary of said first image;
   (b) providing a non-zero motion vector corresponding to a block of a second image, said block being larger than said region;
   (c) estimating a first portion of said block by moving said region in accordance with said non-zero motion vector; and
   (d) displaying said block of said second image, wherein said step (b) comprises the steps of:
     (1) providing said first and second images;
     (2) selecting said block of said second image;
     (3) analyzing said first image to identify said region of said first image as corresponding to said block; and
     (4) generating said nonzero motion vector corresponding to a relative vector distance between said region and said block.

2. The method of claim 1, wherein said step (c) further comprises the step of estimating a second portion of said block by retaining corresponding pels from said first image.

3. The method of claim 1, wherein said step (c) further comprises the step of estimating a second portion of said block by replicating pels of said first image lying along said boundary.

4. The method of claim 1, wherein said step (c) further comprises the step of estimating a second portion of said block by interpolating in accordance with pels of said first image.

5. The method of claim 1, wherein said first and second images are images of real-time motion video processed and displayed on a person computer system.

6. The method of claim 1, wherein said boundary corresponds to a boundary of a memory chip.

7. The method of claim 1, wherein the location of said boundary varies from image to image.

8. The method of claim 1, wherein said step (c) comprises the step of estimating said block independent of image data outside of said region.

9. A method used in coding video image data, comprising the steps of:
   (a) providing a first and a second image to an image encoder, said first and second images each being divided into two or more subimages by one or more boundaries, wherein each subimage of said first image corresponds to a subimage of said second image;
   (b) performing motion estimation on each said subimage of said second image in accordance with corresponding subimage of said first image to generate one or more motion vectors for said second image;
   (c) providing said first image to an image decoder;
   (d) transmitting said one or more motion vectors to said image decoder;
   (e) estimating each said subimage of said second image by performing motion compensation in accordance with at least one of said motion vectors and said corresponding subimage of said first image; and
   (f) displaying said second image, wherein:
   said step (b) comprises the steps of:
     (1) dividing said second image into a plurality of blocks, each block lying within a subimage of said second image;
     (2) comparing each said block of said second image with said corresponding subimage of said first image to attempt to identify a corresponding region of said first image that closely matches said each block of said second image; and
     (3) generating said motion vectors, each of said motion vectors corresponding to a relative vector distance between said block of said second image and said corresponding region of said first image; and
   said step (e) comprises the step of estimating said each block of said second image by moving said corresponding region of said first image in accordance with one of said motion vectors, wherein said step (e) comprises the steps of:
     (1) estimating a first portion of said block of said second image by moving said corresponding region of said first image in accordance with one of said motion vectors; and
     (2) estimating a second portion of said block by replication one or more pels of said first image lying along at least one of said boundaries.

10. The method of claim 9, wherein said corresponding region of said first image abuts at least one of said boundaries and said corresponding region is smaller than a corresponding block of said second image.

11. The method of claim 9, wherein said first and second images are images of real-time motion video that are processed and displayed on a personal computer system.

12. The method of claim 9, wherein at least one of said boundaries correspond to a boundary of a memory chip.

13. The method of claim 9, wherein the location of at least one of said boundaries varies from image to image.

14. The method of claim 9, wherein said step (b) comprises the step of performing motion estimation of said each subimage of said first image in parallel with the performing of motion estimation on each other subimage of said first image.

15. The method of claim 9, wherein said step (e) comprises the step of estimating each said subimage of said second image by performing motion compensation in parallel with the estimating of each other subimage of said second image.

16. The method of claim 9, wherein said step (e) comprises the step of estimating each said subimage of said second image independent of image data outside of said corresponding subimage of said first image.

17. An apparatus used in coding video image data, comprising:

(a) an image encoder for receiving a region of a first image and for generating a non-zero motion vector corresponding to a block of a second image, wherein said region abuts a boundary of said first image and said block is larger than said region; and
(b) an image decoder for estimating a first portion of said block by moving said region in accordance with said motion vector, wherein said image encoder comprises:
  (1) means for receiving said first and second images;
  (2) means for selecting said block of said second image;
  (3) means for analyzing said first image to identify said region of said first image as corresponding to said block; and
  (4) means for generating said non-zero motion vector corresponding to a relative vector distance between said region and said block.

18. The apparatus of claim 17, wherein said image decoder further comprises means for estimating a second portion of said block by retaining corresponding pels from said first image.

19. The apparatus of claim 17, wherein said image decoder further comprises means for estimating a second portion of said block by replicating pels of said first image lying along said boundary.

20. The apparatus of claim 17, wherein said image decoder further comprises means for estimating a second portion of said block by interpolating in accordance with pels of said first image.

21. The apparatus of claim 17, wherein said first and second images are images of real-time motion video processed by said image decoder and displayed on a personal computer system.

22. The apparatus of claim 17, wherein said boundary corresponds to a boundary of memory chip.

23. The apparatus of claim 17, wherein the location of said boundary varies from image to image.

24. The apparatus of claim 17, wherein said image decoder estimates said block independent of image data outside of said region.

25. An apparatus used in coding video image data, comprising:
(a) an image encoder:
  (1) for receiving a first image and a second image, said first and second images each being divided into two or more subimages by one or more boundaries, wherein each subimage of said corresponds to a subimage of said second image; and
  (2) for performing motion estimation on each said subimage of said second image in accordance with a corresponding subimage of said first image to generate one or more motion vectors for said second image; and
(b) an image decoder:
  (1) for receiving said first image;
  (2) for receiving said one or more motion vectors; and
  (3) for estimating each said subimage of said second image by performing motion compensation in accordance with at least one of said motion vectors and said corresponding subimage of said first image, wherein
said image encoder comprises:
  (1) means for dividing said second image into a plurality of blocks, each block lying within said subimage of said second image;
  (2) means for comparing said each block of said second image with said corresponding subimage of said first image to attempt to identify a corresponding region of said first image that closely matches said each block of said second image; and
  (3) means for generating said motion vectors, each of said motion vectors corresponding to a relative vector distance between said block of said second image and said corresponding region of said first image; and
said image decoder comprises means for estimating said each block of said second image by moving said corresponding region of said first image in accordance with one of said motion vectors, wherein said image decoder comprises:
  (1) means for estimating a first portion of said block of said second image by moving said corresponding region of said first image in accordance with one of said motion vectors; and
  (2) means for estimating a second portion of said block by replicating one or more pels of said first image lying along at least one of said boundaries.

26. The apparatus of claim 25, wherein said corresponding region of said first image abuts at least one of said boundaries and said corresponding region is smaller than a corresponding block of said second image.

27. The apparatus of claim 25, wherein said first and second images are images of real-time motion video that are processed by said image decoder and displayed on a personal computer system.

28. The apparatus of claim 25, wherein at least one of said boundaries correspond to a boundary of a memory chip.

29. The apparatus of claim 25, wherein the location of at least one of said boundaries varies from image to image.

30. The apparatus of claim 25, wherein said image encoder comprises a co-processor for performing motion estimation on said each subimage of said first image in parallel with the performing of motion estimation on each other subimage of said first image.

31. The apparatus of claim 25, wherein said image decoder comprises a co-processor for estimating each said subimage of said second image by performing motion compensation in parallel with the estimating of each other subimage of said second image.

32. The apparatus of claim 25, wherein said image decoder estimates each said subimage of said second image independent of image data outside of said corresponding subimage of said first image.

33. A method used in coding video image data, comprising the steps of:
  (a) providing a first image and a second image;
  (b) selecting a block of said second image;
  (c) generating a non-zero motion vector corresponding to a relative vector distance between a region of said first image and said block of said second image, wherein said region abuts a boundary of said first image and said block is larger than said region; and
  (d) encoding said second image in accordance with said non-zero motion vector.

34. The method of claim 33, wherein said first and second images are images of real-time motion video that are processed and displayed on a personal computer system.

35. The method of claim 33, wherein said boundary corresponds to a boundary of a memory chip.

36. The method of claim 33, wherein the location of said boundary varies from image to image.

37. The method of claim 33, further comprising the steps of:
  (e) selecting a second block of said second image; and
  (f) generating a second non-zero motion vector corresponding to a relative vector distance between a second region of said first image and said second block of said second image, wherein said step (f) is performed in parallel with said step (c)

38. The method of claim 33, further comprising the steps of:
  (e) estimating a first portion of said block by moving said region in accordance with said non-zero motion vector; and
  (f) displaying said block of said second image.

39. The method of claim 38, wherein said step (e) further comprises the steps of estimating a second portion of said block by retaining one or more pels from said first image.

40. The method of claim 38, wherein said step (e) further comprises the steps of estimating a second portion of said block by replicating one or more pels of said first image lying along said boundary.

41. The method of claim 38, wherein said step (e) further comprises the steps of estimating a second portion of said block by interpolating in accordance with pels of said first image.

42. The method of claim 38, said step (e) comprises the step of estimating said first portion of said block independent of image data outside of said region of said first image.

43. The method of claim 38, further comprising the steps of:
  (g) selecting a second block of said second image;
  (h) generating a second non-zero motion vector corresponding to a relative vector distance between a second region of said first image and said second block of said second image; and
  (i) estimating a first portion of said second block by moving said second region in accordance with said second non-zero motion vector, wherein said step (i) is performed in parallel with said step (e).

44. An apparatus used in coding video image data, comprising:
  (a) an image encoder:
    (1) for providing a first image and a second image;
    (2) for selecting a first block of said second image;
    (3) for generating a first non-zero motion vector corresponding to a relative vector distance between a region of said first image and said first block of said second image, wherein said region abuts a boundary of said first image and said first block is larger than said region; and
    (4) for encoding said second image in accordance with said first non-zero motion vector.

45. The apparatus of claim 44, wherein said first and second images are images of real-time motion video that are processed and displayed on a person computer system.

46. The apparatus of claim 44, wherein said boundary corresponds to a boundary of a memory chip.

47. The apparatus of claim 44, wherein the location of said boundary varies from image to image.

48. The apparatus of claim 44, wherein said image encoder:
  (5) selects a second block of said second image; and
  (6) generates a second non-zero motion vector corresponding to a relative vector distance between a second region of said first image and said second block of said second image, wherein said generation of said first non-zero motion vector is performed in parallel with said generation of said second non-zero motion vector.

49. The apparatus of claim 44, further comprising:
  (b) an image decoder:
    (1) for estimating a first portion of said first block by moving said region in accordance with said first non-zero motion vector; and p2 (2) for displaying said first block of said second image.

50. The apparatus of claim 49, wherein said image decoder estimates a second portion of said first block by retaining one or more pels from said first image.

51. The apparatus of claim 49, wherein said image decoder estimates a second portion of said first block by replicating one or more pels of said first image lying along said boundary.

52. The apparatus of claim 49, wherein said image decoder estimates a second portion of said first block by interpolating in accordance with pels of said first image.

53. The apparatus of claim 49, said image decoder estimates said first portion of said first block independent of image data outside of said region of said first image.

54. The apparatus of claim 49, wherein said image decoder:
  (3) selects a second block of said second image;
  (4) generates a second non-zero motion vector corresponding to a relative vector distance between a second region of said first image and said second block of said second image; and
  (5) estimates a first portion of said second block by moving said second region in accordance with said second non-zero motion vector, wherein said estimation of said first portion of said second block is performed in parallel with said estimation of said first portion of said first block.

55. A method used in coding video image data, comprising the steps of:
  (a) providing a region of a first image, wherein said region abuts a boundary of said first image;
  (b) providing a non-zero motion vector corresponding to a block of a second image, said block being larger than said region;
  (c) estimating a first portion of said block by moving said region in accordance with said non-zero motion vector; and
  (d) displaying said block of said second image, wherein said step (c) further comprises the step of estimating a second portion of said block by replicating pels of said first image lying along said boundary.

56. An apparatus used in coding video image data, comprising:
  (a) an image encoder for receiving a region of a first image and for generating a non-zero motion vector corresponding to a block a second image, wherein said region abuts a boundary of said first image and said block is larger than said region; and
  an image decoder for estimating a first portion of said block by moving said region in accordance with said motion vector, wherein said image decoder further comprises means for estimating a second portion of said block by replicating pels of said first image lying along said boundary.

* * * * *

UNITED STATES PATENT AND TRADEMARK OFFICE
CERTIFICATE OF CORRECTION

PATENT NO. : 5,436,666
DATED : July 25, 1995
INVENTOR(S) : Brian Astle

It is certified that error appears in the above-indentified patent and that said Letters Patent is hereby corrected as shown below:

Column 9, line 36, delete "nonzero" and insert therefor --non-zero--.

Column 9, line 53, delete "person" and insert therefor --personal--.

Column 10, line 2, after "with" insert --a--.

Column 10, line 54, delete "of" and insert therefor --on--.

Column 11, line 49, after "said" insert --first image--.

Column 13, line 60, delete "person" and insert therefor --personal--.

Column 14, line 12, delete "p2".

Signed and Sealed this

Fifth Day of March, 1996

*Attest:*

BRUCE LEHMAN

*Attesting Officer*     Commissioner of Patents and Trademarks